United States Patent [19]

Swavely

[11] 4,405,969
[45] Sep. 20, 1983

[54] ANTI-STATIC HOSE ASSEMBLIES

[75] Inventor: Donald F. Swavely, Kenhorst, Pa.

[73] Assignee: The Polymer Corporation, Reading, Pa.

[21] Appl. No.: 307,843

[22] Filed: Oct. 2, 1981

[51] Int. Cl.³ .............................................. H05F 3/00
[52] U.S. Cl. ...................................... 361/215; 174/47
[58] Field of Search ........................... 361/215; 174/47

[56] References Cited

U.S. PATENT DOCUMENTS 3,042,737  7/1962  Brumbach ............................. 174/47
3,457,359  7/1969  Soucy ............................. 361/215 X Primary Examiner—Reinhard J. Eisenzopf
Attorney, Agent, or Firm—Richard O. Church

[57] ABSTRACT

A hose assembly of limited conductivity designed to bleed static electric charges such as encountered in paint spraying. The assembly includes, as is conventional, a stem fitting 1, a reinforced hose 3 fitted over the stem 7 of the fitting 1, and a crimped shell 5. The novel element is a conductive coupling ring 13 that is adapted to establish an electrically conductive path between the hose coupling 1 and the conductive element 26 of the hose 3. The conductive coupling ring 13 includes a number of tines 19 and, when assembled between the coupling 1 and the hose 3 will, on its one side, seat against a shoulder 11 of the coupling 1, and the tines 19, on its other side, will penetrate the reinforcement 23 and 24 of the hose 3 and establish electrical contact with the conductive element 26.

4 Claims, 4 Drawing Figures

ANTI-STATIC HOSE ASSEMBLIES

TECHNICAL FIELD

This invention relates to anti-static hose assemblies in which the hose has a conductive element for draining and preventing the accumulation of static electric charges. More particularly, this invention relates to methods and means for establishing electrical continuity between the conductive element of the hose and the fittings attached to the hose assembly.

DEFINITIONS

The term "tube" as used herein, refers to a flexible polymeric intertubular component hose that serves as an impervious conduit for the transmission of fluids.

The term "reinforcement" as used herein, refers to one or more plies of high tenacity synthetic yarns or monofilaments that are applied in tensioned relationship (as by spiral wrapping, braiding, knitting, or the like) over the tube to increase the burst strength and kink resistance of the tube.

The term "cover" as used herein, refers to a continuous protective layer of polymeric material that envelopes the reinforcement.

The term "hose" as used herein, refers to a composite structure adapted for the transmission of fluids under pressure which include the tube, a reinforcement, and a cover.

The term "fitting" is used herein to mean a metal fixture that, when secured to a free end of a hose, will facilitate connecting the hose in fluid sealing relationship with a tool, another conduit, a working chamber or the like.

The term "hose assembly" is used to mean a hose to which fittings have been attached.

The term "stem fitting" is used to mean a type of fitting that has a stem for insertion into the interior diameter of the tube and an element for securing the hose onto the stem. The means for securing the hose on the stem can include, for example, a compression element such as a hose clamp, a ring which is crimped or swaged over the hose, or a threaded fitting which can be screwed onto a shoulder of the stem to compress the hose onto the stem.

BACKGROUND ART

There are many applications in which flexible high-pressure thermoplastic hose is used for the transmission of volatile or combustible fluids. Since the materials from which hoses are generally manufactured (i.e., rubber or synthetic polymers) are essentially non-conductive, it is a common practice in these applications to incorporate an element of at least limited conductivity within the body of the hose to permit grounding of the hose and the dissipation of static electric charges. A typical application is a paint spray hose in which paints or lacquers are pumped through a flexible hose to a spray gun at relatively high pressures. In some recently developed commercial installations, the pressures may reach as much as 700 kg/cm$^2$. The flow of fluid materials through the hose may cause static electric charges to build up which, if not discharged to ground, can lead to explosion of the volatile solvents or other paint vehicles.

To avoid the danger of explosion and fire when inflammable fluids are transmitted through thermoplastic hoses, it is conventional to incorporate a conductive element within the wall of the hose. In co-pending U.S. patent application Ser. No. 085,386 filed on Oct. 16, 1979, now abandoned, having a common assignee and which is incorporated herein by reference, there is disclosed a grounding element in the form of a tape of limited conductivity. The tape is made from a heat sinterable plastic filled with finely divided carbon particles and, in a preferred embodiment, is comprised of a sintered tape having a matrix of polytetrafluoroethylene filled with finely divided carbon black. An anti-static element of this sort is quite useful since it has sufficient conductivity to drain static electric charges and sufficient strength to withstand abuse while exceeding the industry standard for pressure pulses without loss of continuity. It is, of course, necessary to connect the anti-static element to a ground and this conventionally accomplished bringing the anti-static metal fitting element into contact with a fitting which, in turn, can readily be grounded. It has been a recurring problem to find a simple means for insuring electrical contact between the conductive element and the fitting, particularly considering the fact that the conductive member may pull back under the cover of the hose when the hose is cut to length to attach fittings.

DISCLOSURE OF THE INVENTION

Accordingly, it is an object of this invention to provide a hose assembly that may be grounded to prevent the accumulation of static electric charges.

It is a further object of this invention to provide a simple apparatus for establishing conductivity between the conductive element of a hose, preferably in the form of a conductive tape, and a fitting attached to the end of the hose.

These and other objects of this invention are achieved through the use of a metal ring which is slipped over the stem of a hose fitting. One side of the ring is seated against the fitting and the other side has a number of upstanding tines (prongs) that are adapted to fit into the region of the hose between the tube and the cover and engage the conductive element.

DESCRIPTION OF THE DRAWINGS

These and other objects of this invention can better be understood from the description of the accompanying drawings in which.

Figure 1:
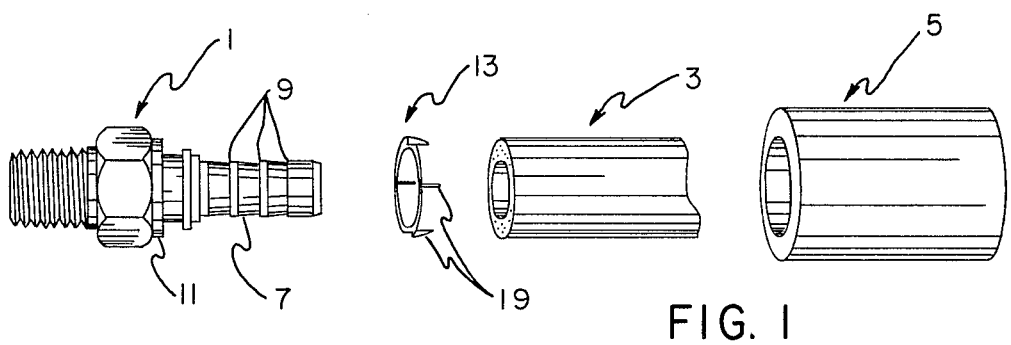
FIG. 1 is an exploded schematic view illustrating the elements of this invention.

In somewhat more detail, there is illustrated in FIG. 1 a hose fitting 1 which is axially aligned for insertion into a hose 3 which, in turn, is adapted to receive a deformable shell 5 in surrounding relationship. The fitting 1 has a substantially tubular stem portion 7 dimensioned to fit snugly within the interior diameter of the hose 3 and carries a number of barbs 9 designed to provide a better grip on the mating inner surface of the hose 3. The stem portion 7 of the fitting 1 terminates at shoulder 11. The conductive coupling ring of this invention 13 is an annulus having an inner diameter 15 that will permit the ring to fit over the stem 7 of the fitting 1. The outer diameter 17 of the ring is dimensioned to be equal to and preferably slightly smaller than the inside diameter of the cover of the hose.

The ring 13 can conveniently be made in a stamping operation in which several tines 19 are formed at the circumference of the ring by cutting into a portion of the ring and bending the cut portion at a 90° angle to the plane of the ring 13. This raises tines 19 which are dimensioned to be long enough to extend into that area of the hose that contains the conductive element, i.e., between the cover and the tube, and make contact with the conductive element. Sufficient tines 19 are provided so that at least one of the tines will make contact with the conductive element of the hose no matter how the coupling ring is positioned on the stem 7. For example, if the conductive element covers 30% of the circumference of the hose (that is, an arc of 108°) one of four tines spaced 90° apart must necessarily engage the conductive element.

Figure 2:
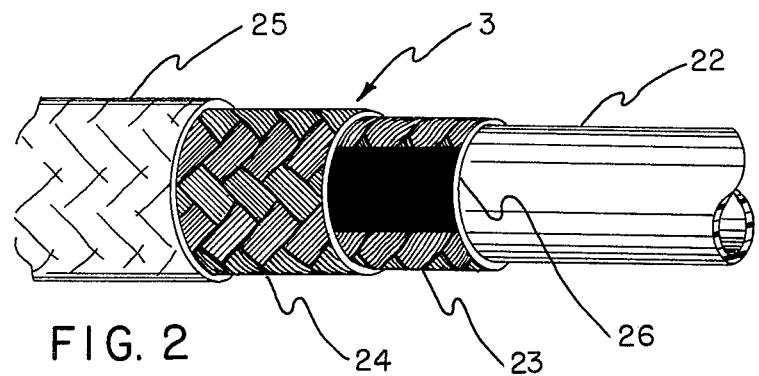
FIG. 2 is a view, partially cut away, showing the several elements of an anti-static hose useful in the practice of this invention.

FIG. 2 illustrates a conductive hose useful in the practice of this invention. The hose 5 is comprised of a tube 22, a first braided layer 53, and a second braided layer 24. A protective cover 25 is extruded over the second braided layer 24. A conductive tape 26 is incorporated in the hose 1 between the first braided layer 23 and the second braided layer 24.

As can be understood from the drawings, the conductive coupling ring 13 is placed over the stem 7 of fitting 1. The hose 3 is then advanced over the stem 7 until the tines 19 of the conductive coupling ring 13 are fully advanced into the hose 3 and the ring 13 is seated against the shoulder 11. A shell 5 is then positioned over the hose and stem and is swaged to securely position the hose 3 onto the stem 7 of fitting 1.

Figures 3, 4:
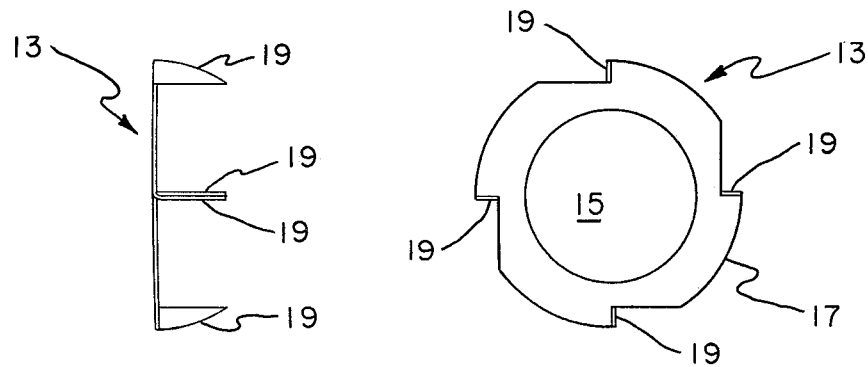
FIG. 3 is a plan view of the conductive coupling ring of this invention.
FIG. 4 is a side view of the conductive coupling ring shown in FIG. 3.

FIGS. 3 and 4 illustrate a preferred embodiment of the conductive coupling ring of this invention both from the standpoint of utility and ease of manufacture. The tines 19 as here shown are formed by cutting halfway along a cord of the coupling ring 13 and the cut portion is bent at a 90° angle to the plane of the coupling ring 13.

The outside diameter 17 of the coupling ring 13 is selected to be slightly smaller than the inside diameter of the cover and the inside diameter 15 of the coupling ring 13 is selected to be approximately equal to the inside diameter of the tube but, in any event, large enough to pass over the stem 7 of the fitting 1.

It can also be understood that the tine 19 is designed to have a width that is less than the thickness of the reinforcements so that it will fit between the cover 25 and the tube 22 of the hose.

I claim:

1. An anti-static hose assembly comprising a hose, an anti-static element enbedded between a cover and a tube of the hose, and a stem fitting mounted on the hose, the improvement comprising a conductive coupling ring seated between and in contacting relationship with the stem fitting and the hose: the conductive coupling ring having a plurality of tines extending away from the stem fitting and into the end of the hose in a region between the cover and the tube and into electrical contacting relationship with the anti-static element.

2. An anti-static hose assembly according to claim 1 wherein the anti-static element is a tape comprised of a heat sinterable thermoplastic material filled with carbon black.

3. A hose assembly including a stem fitting and a hose incorporating an anti-static element in which a conductive coupling ring is utilized to make electrical contact between the stem fitting and a conductive element in which the coupling ring is seated on its one side against a shoulder on the stem fitting and on its other side has outstanding axially aligned tines penetrating the hose in the region between a tube and a cover of the hose to engage the anti-static member.

4. A hose assembly according to claim 2 in which the conductive coupling ring is an annulus having a plurality of tines that:
- are an integral part of the annulus;
- are equally spaced around the annulus;
- are perpendicular to the plane of the annulus;
- and are formed by cutting partway along a cord passing through the body portion of the annulus and bending the cut portions at right angles to the plane of the annulus.

* * * * *